(12) United States Patent
Muren et al.

(10) Patent No.: US 9,038,938 B2
(45) Date of Patent: May 26, 2015

(54) UAV KIT (75) Inventors: Petter Muren, Nesbru (NO); Trygve Frederik Marton, Slependen (NO); Geir Morten Mellem, Tonsberg (NO); Dag Henning Paulsen, Voyenenga (NO)

(73) Assignee: Prox Dynamics AS (NO)

(*) Notice: Subject to any disclaimer, the term of this patent is extended or adjusted under 35 U.S.C. 154(b) by 72 days.

(21) Appl. No.: 14/003,406

(22) PCT Filed: Mar. 26, 2012

(86) PCT No.: PCT/EP2012/055298
§ 371 (c)(1),
(2), (4) Date: Nov. 1, 2013

(87) PCT Pub. No.: WO2012/130790
PCT Pub. Date: Oct. 4, 2012

(65) Prior Publication Data
US 2014/0217242 A1    Aug. 7, 2014

(30) Foreign Application Priority Data
Mar. 28, 2011 (NO) .................................. 20110476

(51) Int. Cl.
*B64C 39/02* (2006.01)
*A63H 27/00* (2006.01)
*B64D 47/08* (2006.01)

(52) U.S. Cl.
CPC .............. *B64C 39/024* (2013.01); *A63H 27/12* (2013.01); *B64C 39/028* (2013.01); *B64C 2203/00* (2013.01); *B64C 2201/201* (2013.01); *B64C 2201/024* (2013.01); *B64C 2201/127* (2013.01); *B64C 2201/203* (2013.01); *B64D 47/08* (2013.01)

(58) Field of Classification Search
CPC .. B64C 39/24; B64C 39/28; B64C 2201/201; B64C 2201/203; A63H 27/00; A63H 27/12
See application file for complete search history.

(56) References Cited

U.S. PATENT DOCUMENTS

2007/0106473 A1    5/2007   Bodin et al.
2009/0170395 A1*   7/2009   Wai ................................ 446/38

FOREIGN PATENT DOCUMENTS

EP    1524189 A1    4/2005
GB    2444446 A     4/2008
WO    2011012936 A1 2/2011
WO    2012130790 A2 10/2012

OTHER PUBLICATIONS

International Search Report and Written Opinion dated Nov. 19, 2012 for International Application Serial No. PCT/EP2012/055298, International Filing Date: Mar. 26, 2012 consisting of 12 pages.

* cited by examiner

*Primary Examiner* — Philip J Bonzell
*Assistant Examiner* — Nicholas McFall
(74) *Attorney, Agent, or Firm* — Christopher & Weisberg, P.A.

(57) ABSTRACT

The embodiments herein disclose a personal UAV kit for storing, preparing and remote control of micro UAVs (40). The UAV kit includes a base unit (10), a control unit (30) and at least one UAV. The UAVs can typically be a winged aircraft with foldable wings or a helicopter with a two-bladed or foldable rotor. The base unit comprises UAV compartments for housing at least one UAV, bay (14) for storing the control unit, batteries and electronic components for charging, communication, control and processing and storing of data. In addition, the system includes an eye near display device for viewing system information and sensor data, typically live video, transmitted from the UAV.

17 Claims, 6 Drawing Sheets

UAV KIT

CROSS-REFERENCE TO RELATED APPLICATIONS

This application is a Submission Under 35 U.S.C. 371 for U.S. National Stage Patent Application of, and claims priority to, International Application Number PCT/EP2012/055298 entitled UAV KIT, filed Mar. 26, 2012, which is related to and claims priority to Norwegian Patent Number 20110476, filed Mar. 28, 2011, the entirety of all of which are incorporated herein by reference.

TECHNICAL FIELD

The embodiments herein relate to an Unmanned Aerial Vehicle (UAV) kit for safe storage and efficient operation of UAVs in the field.

BACKGROUND

Modern warfare and law enforcement are characterized by an increasing need for up-to-date situational awareness. To track down, or to protect against, criminals, paramilitary forces or terrorists, law enforcement personnel and soldiers often have an immediate need for information about what is around the next corner or over the hill.

Hostile forces frequently hide themselves from view or exploit the local terrain to gain tactical advantage or escape from pursuers. In the presence of hostile forces, a simple brick wall, barbed wire fence, a body of water, buildings or even a large open area can be an insurmountable obstacle when time is of the essence and tactical resources are unavailable. An active or undetected threat can make the situation dangerous.

Visible indications, noises or predictable actions can reveal friendly forces and put them at risk. Stealth and surprise, however, are important elements that can give a tactical advantage. Unmanned Aerial Vehicles (UAV) equipped with video cameras that transmit back live pictures allows their operator to perform surveillance tasks and gather information from a safe position without exposing themselves.

Practically all existing UAV systems, even the smallest ones, require significant support equipment like; transport cases, ground control station, displays, antennas and refuelling and/or recharging systems for their proper operation. Due to safety reasons their operation must be coordinated with other activities, both on the ground and in the air. The lack of portability due to the size of the UAVs and the necessary support equipment, as well as the safety issues, limits the possibility for a law enforcement man or an individual soldier to fully utilize the potential provided by an UAV system.

Traditionally an UAV is a shared resource, operated by dedicated people or units. In order to always be available, the complete system (including the UAVs) must be small enough to be carried by, and operated by, a single person without having to sacrify other vital equipment. It must also be small and light weight enough to be operated without posing any safety risk to the surroundings.

SUMMARY

The embodiments herein provide an UAV-kit for storage and control of at least one UAV, comprising a control unit for controlling the UAV(s) adjusted for one-hand operations, a base unit including one compartment for each UAV and a bay for the control unit where the compartment and bay are shaped to house the UAV(s) and the control unit. A stand-by connector inside each compartment housing the UAV(s) is providing electric contact between the base unit and the respective UAV(s) when the UAV(s) is/are stored in the UAV-kit. One or more fastening device(s) for the UAV(s) are located inside the associated compartment(s) and are being adjusted to keep the UAV(s) firmly attached to the base unit when exposed to movements, but still detachable from the base unit.

The UAV-kit for storage and control of at least one UAV, comprises at least one UAV with a UAV head and a UAV tail and a control unit with a control head and a handle for controlling the UAV(s) adjusted for one-hand operations. The UAV(s) and the control unit when stored in the UAV-kit is/are stacked so that the UAV head(s) is/are placed side-by-side with the handle. The UAV-kit further comprises a base unit including one compartment for each UAV and one bay for the control unit. The base unit is shaped to house the UAV(s) and the control unit. The UAV-kit comprises a stand-by connector inside each compartment housing the UAV(s) providing electric contact between the base unit and the respective UAV(s) when the UAV(s) is/are stored in the UAV-kit. The respective stand-by connector when the associated UAV is placed in the UAV-kit is positioned in line with and in electrical contact with a corresponding second connector device mounted at the underside of the respective UAV. The UAV-kit comprises one or more fastening device(s) for each UAV(s) inside the associated compartment(s) being adjusted to keep the UAV(s) firmly attached to the base unit, but still detachable from the base unit.

In some embodiments, the compartment for each UAV comprises a bay and a lid, hinged together. Each compartment may be formed by a first cavity in the bay and a second cavity in the associated lid.

In some embodiments, the respective fastening device(s) comprises two spring clips attached inside the second cavity positioned on each side of the UAV when the UAV is stored in the UAV-kit. The spring clips may hold the respective UAV(s) in the associated lid with a spring force which is sufficiently strong to hold the respective UAV(s) in the associated lid when the lid is opened, but sufficiently week to make it easy to grab the respective UAV and lift it out.

In some embodiments, the respective fastening device(s) comprises two magnets attached inside the second cavity positioned on each side of the UAV when the UAV is stored in the UAV-kit. The magnets may hold the respective UAV(s) in the associated lid with a magnetic force which is sufficiently strong to keep the respective UAV(s) in the associated lid when the lid is opened, but sufficiently week to make it easy to grab the respective UAV and lift it out.

In some embodiments, the respective stand-by connector when the associated UAV is placed in the UAV-kit enables uploading of software to the associated UAV.

In some embodiments, the respective stand-by connector when the associated UAV is placed in the UAV-kit enables recharging of a battery installed in the associated UAV.

In some embodiments, the respective stand-by connector provides exchange of coding keys for provisioning a unique coded communication between the UAV(s) and the base unit when on mission.

In some embodiments, the respective stand-by connector when the associated UAV is placed in the UAV-kit enables downloading of data from the associated UAV.

In some embodiments, the control unit contains at least one radio transmitter adjusted to transmit control signals to the UAV(s).

In some embodiments, the control unit contains at least one radio receiver adjusted to receive data from the UAV(s).

In some embodiments, the base unit is provided with an activation button for starting an initializing process preparing the UAV(s) for a mission.

In some embodiments, the UAV(s) comprise(s) a Global Positioning System (GPS) receiver and the control unit is adjusted to provide the UAV(s) with initial GPS data during an initializing process.

In some embodiments, the UAV(s) comprise(s) sensors adjusted to pick up a characteristic hand-movement indicating that the UAV should start a mission.

In some embodiments, the base unit is provided with a video output device for connection of a video display to the base unit for streaming and playing back video recorded by the UAV(s) and transmitted on a radio link between the UAV(s) and the base unit.

In some embodiments, the base unit includes at least one base battery and a charger. The charger may be adjusted to charge UAV batteries in the UAV(s) in stand-by mode, and the base battery may be adjusted to supply power to the charger and the electronics in the base unit.

In some embodiments, the UAV-kit comprises a poach containing the base unit provided with suspension means adjusted to make the UAV kit attachable to an operator's clothing.

In some embodiments, the lid(s) are hinged so that the UAV(s) is/are facing towards an operator when the lid(s) is/are in the open position.

BRIEF DESCRIPTION OF THE DRAWINGS

The following detailed description of the embodiments herein is accompanied by drawings in order to make it more readily understandable. In the drawings.

DETAILED DESCRIPTION

In the following, the embodiments herein will be discussed and described by referring to the accompanying drawings.

The embodiments herein disclose a personal UAV kit for storing, preparing and remote control of micro UAVs. The UAV kit includes a base unit, a control unit and at least one UAV. The UAVs can typically be a winged aircraft with foldable wings or a helicopter with a two-bladed or foldable rotor. The base unit comprises UAV compartments for housing at least one UAV, a bay for storing the control unit, batteries and electronic components for charging, communication, control and processing and storing of data. In addition, the system includes an eye near display device for viewing system information and sensor data, typically live video, transmitted from the UAV.

Figure 1:
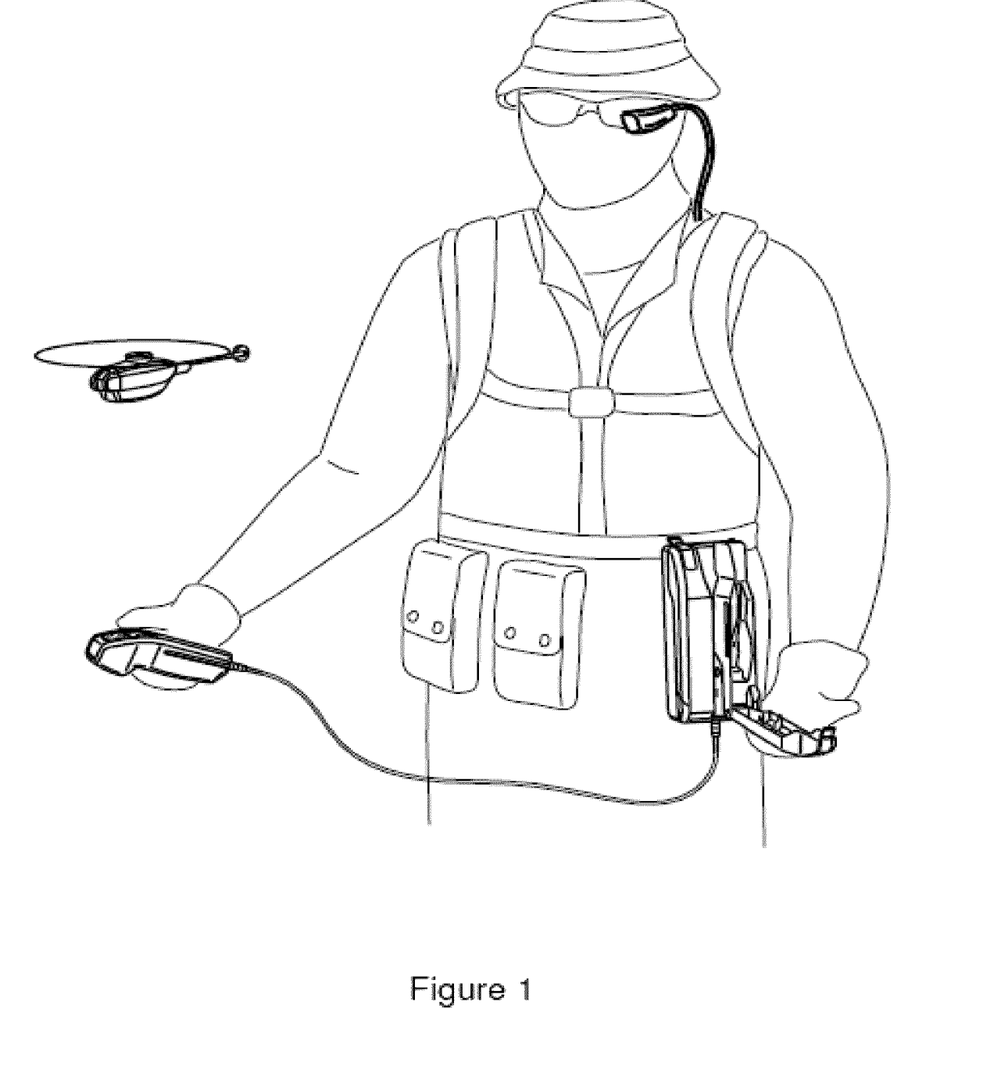
FIG. 1 is an overall view of a UAV-kit according to the embodiments herein, in use and attached to an operator.

In FIG. 1 a UAV kit according to an example embodiment of the is shown. The kit includes two micro helicopter UAVs (one showed in the air and one hidden in the base of the kit), a single-hand control unit and a base unit with batteries, electronics, connections, UAV compartments and a control unit bay. A head mounted display is connected to the base and receives power and video signals trough a cable. For extra protection the UAV kit may be housed in a durable but soft pouch (not shown) that may be fully opened for easy access to the kit. The poach can be "hinged" in its lower end, and hold in place with straps in the upper part when it covers the kit. To gain access to the UAV kit, the poach is opened and folded down. The whole UAV kit can be attached to outer clothes or harness for easy access in operative situations.

By referring to FIGS. 2, 3, 4 and 5 an example embodiment is discussed.

Figure 2A:
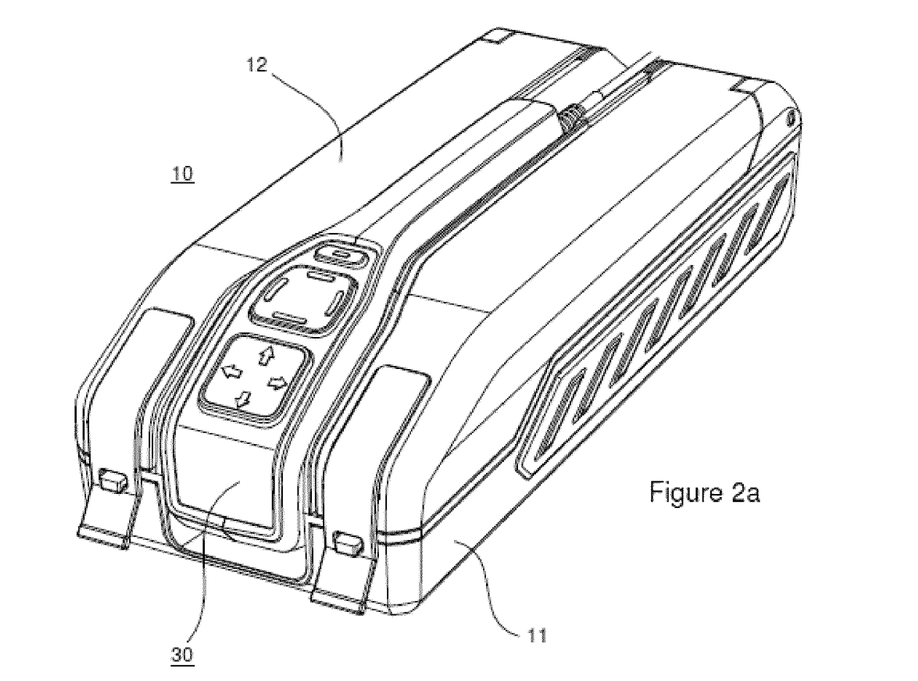
FIGS. 2a and 2b are a perspective views, from above and below, of a UAV-kit according to the embodiments herein, shoving the base unit and the control unit in a stowed position.
Figure 2B:
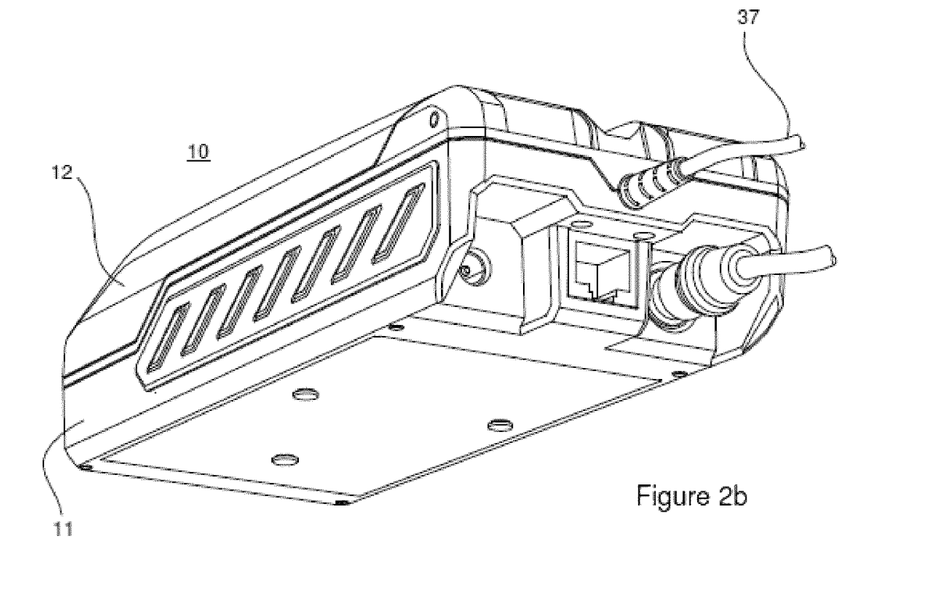
Figure 3:
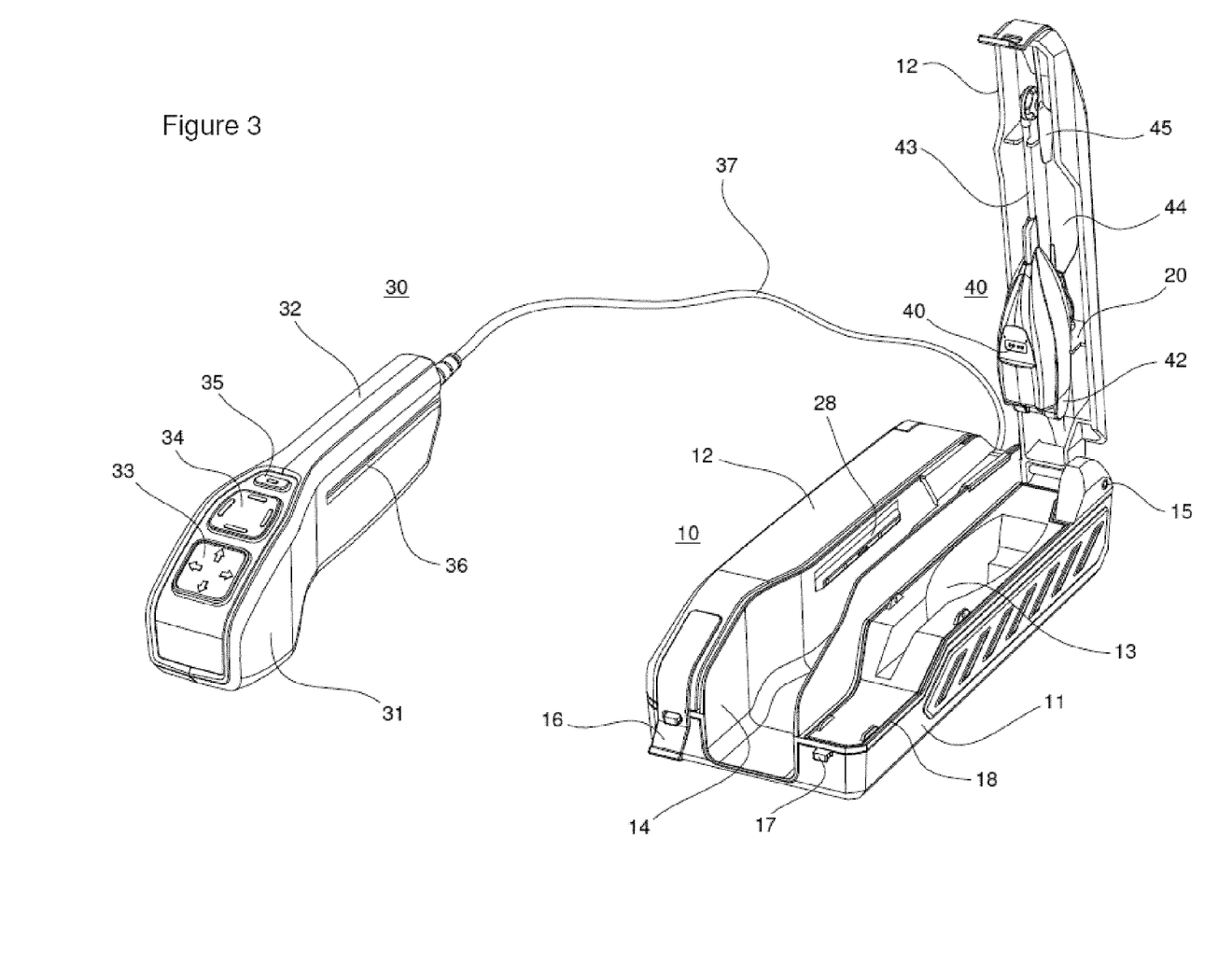
FIG. 3 is a perspective view of a UAV-kit according to the embodiments herein, shown with the control unit taken out from the base and one UAV in ready position.
Figure 4:
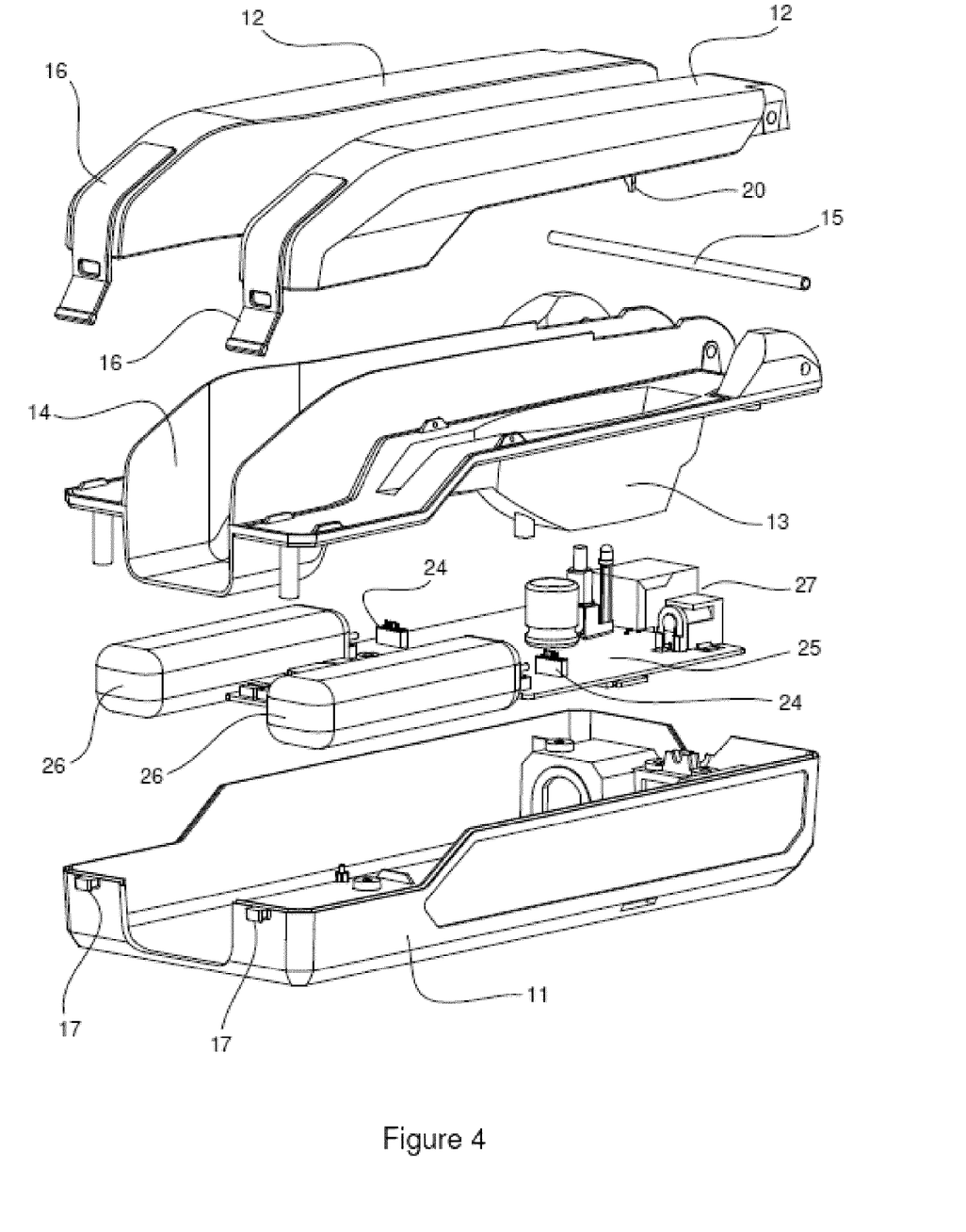
FIG. 4 is an exploded view of the base unit of a UAV-kit according to the embodiments herein.

The micro-helicopter UAV 40 has a rounded body 41, a single two-bladed main rotor 44 and a tail 43 with a small vertical tail rotor 45. The body 41 has a front end 42 with means for connecting sensors (e.g. video camera), a top part 46 to which the main rotor 44 is mounted, a lower part or bottom 47 having electrical connectors 48 for programming and recharging and an aft part ending in an elongated tail 43 with the tail rotor 45. The control unit 30 intended for one-hand operation could typically have a shape similar to an aircraft's single hand control stick, where the control buttons 33,34 are placed on the control unit head 31 and the rest of the control unit constitute the handle 32 which typically is thinner than the control unit head 31 to provide a natural handgrip around the control unit 30.

The inner shape 13 of the UAV compartments is adjusted to the shape of the UAVs 40 they are housing. Similarly the bay 14 for the control unit is shaped to hold and protect the control unit 30 when not in use. The most space effective stacking of compartments for two micro-helicopter UAVs 40 and a control unit 30 is indicated. By placing the helicopter tails 43 side by side on each side of the control unit head 31, and the control unit handle 32 between the helicopter bodies 41, the total width of the kit is minimized.

FIG. 3 is a detailed illustration of the UAV kit with the control unit 30 taken out of its bay 14 and one of the UAVs 40 visible inside the opened compartment lid 12. The two UAV compartments are shown on each side of the control unit bay 14. The compartments and bay are arranged according to the above-mentioned stacking. The UAV compartments firmly hold the UAVs so they are kept stable within the compartments, even with rough handling and strokes to the kit. The UAV compartments are split lengthwise in two approximately equally sized parts, a bay part 11 and a lid part 12. The two parts are connected with a hinge connection 15 in the wide (lower) end. The two bay parts are in this embodiment integrated in the base unit 10.

The lid part 12 constitutes the lid of the UAV compartment and can be locked and secured to the bay part 11 by a flexible strap 16 positioned in the narrow (upper) end of the lid 12. To lock and secure the lid 12 in a closed position the flexible strap 16 is pulled over a knob 17 in the bay part 11. To protect the UAVs from dust and water, a rubber seal 18 is placed around the circumference of the bay part 11. The lid part 12 has an accordingly recess around its edges that meets the rubber seal to form a tight connection when the lid 12 is closed.

In the embodiment in FIG. 3, the helicopter UAV 40 is attached to the lid 12 with the main rotor 44 facing towards the inside of the lid 12. When the UAV kit is hanging on a human approximately in the belt height as indicated in FIG. 1, the UAV 40 will conveniently face its bottom part 48 upwards and the nose towards the human when the lid 12 is opened. In this position it is easy to grip the helicopter UAV 40, lift it loose from the lid 12 and swing it up and into position for take-off (the helicopter takes off from the operator's hand).

Figure 6A:
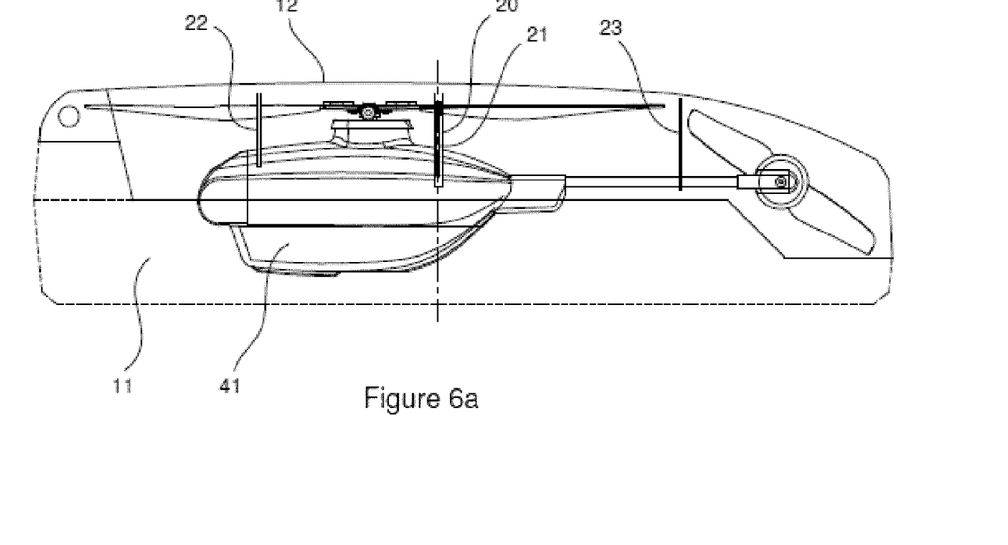
FIGS. 6a, 6b and 6c are views of the mechanical connection holding the UAV to the lid part of the base unit.
Figure 6B:
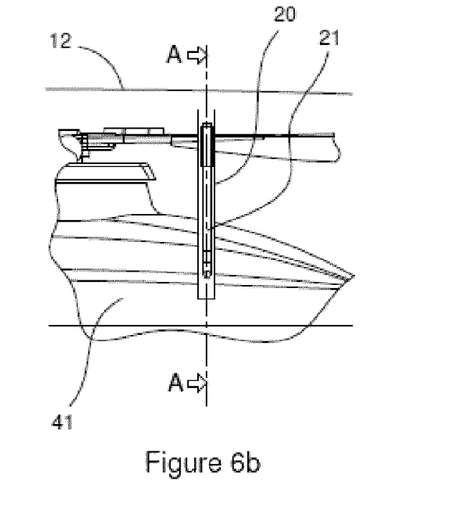
Figure 6C:
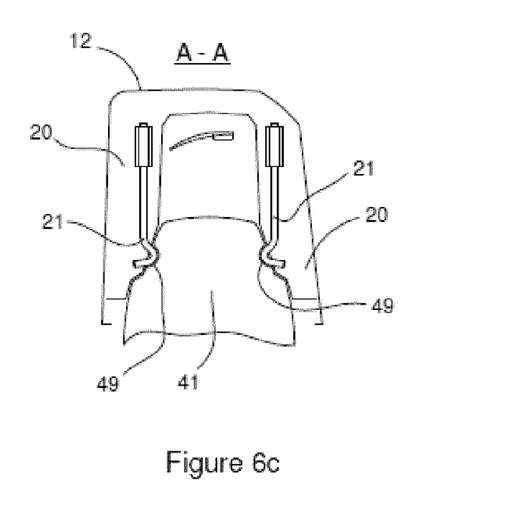

The UAV 40 should be attached firmly enough, to be kept safely in place when the lid 12 is closed, and to preventing it from falling off when the lid 12 is opened. At the same time, the UAV 40 should be easy to be removed from its position in the lid 12 with a simple hand movement. Cross section views of such an attachment are shown in FIG. 6. Here, two spring clips 21 attached to a central guide rib 20 in the lid 12 interacts with corresponding groves 49 on each side of the UAV body 41 locks the UAV 40 with a spring force which is sufficiently strong to keep it in place, but at the same time sufficiently week to make it easy to grab the UAV 40 and lift it out with one hand. The spring clips 21 can also be supplemented or substituted with a pair of magnets (not shown). The UAV nose is guided by a set of front ribs 22 in the lid 12 and the tail 43 is guided by a separate rib 23 in the opposite part of the lid 12.

The hinge 15 in the wide end of the lid 12 is adjusted to have an internal friction and/or snap arrangement allowing the lid 12 to be firmly held in an open position when the UAV 40 is lifted out of it.

Figure 5A:
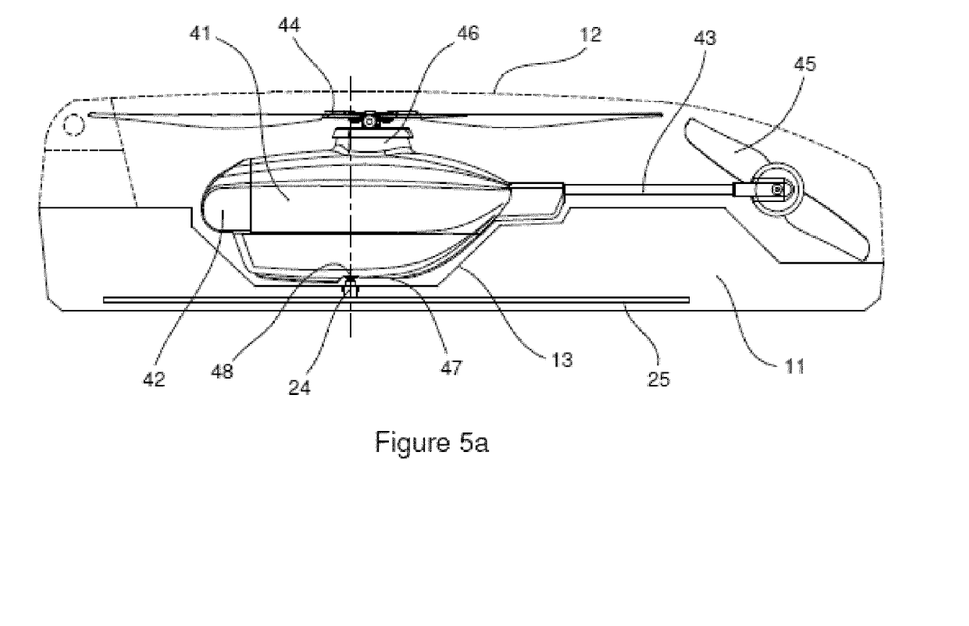
FIGS. 5a, 5b and 5c are views of the electric stand-by connector device connecting the UAV to the base unit.
Figure 5B:
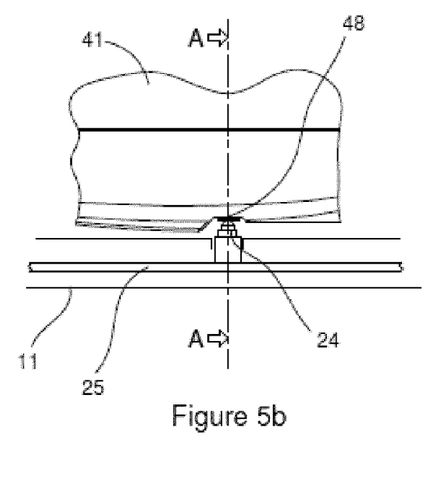
Figure 5C:
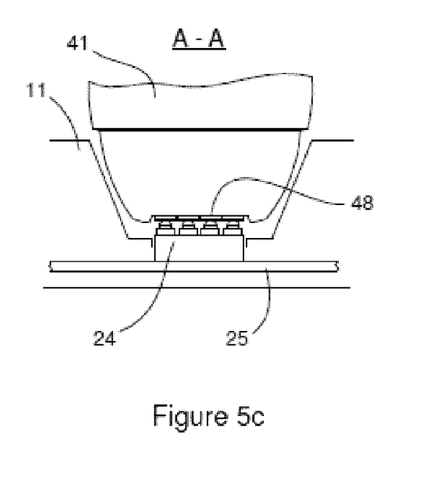

Inside the bay part 11 of an UAV compartment, a first stand-by connector 24) is provided. Cross section views of such a connector arrangement are shown in FIG. 5. When the UAV 40 is attached to the lid 12 and the lid part is locked to the bay part 11, the first connector 24 is positioned just in line with and in electrical contact with a corresponding second contact device 48 at the bottom 47 of the UAV body. The first contact devices 24 could be electrical spring connectors with i.e. spring-loaded pins. In an alternative embodiment the connector arrangement could be a jack/socket kind of connector. If it is a jack/socket connector, some mechanical connection force may be necessary to provide a good and secure electrical connection. It should then, however, be week enough to safely disconnect when the lid 12 is opened and the UAV 40 lifted up.

The above-mentioned stand-by connector arrangement 24,48 could have several functions in both transferring electricity and electronic signals between the UAV 40 and the base unit 10. First of all, it is important for recharging the UAV 40. The battery in a micro-helicopter UAV is a compromise between capacity, power (maximum current draw) and weight, where the latter probably is the most important. Small electrically powered UAVs are often equipped with rechargeable batteries that must be recharged after every mission and also periodically during storage.

To secure maximum efficiency with the UAV 40 out of operational use as little as possible, the UAV 40 should be recharged as soon as possible after a mission. This is done according to the embodiments herein by enabling dedicated pins in the stand-by connector 48 at the bottom of the UAV 40 to receive charging current to the UAV battery, and by providing the base with excessive power means (extra batteries 26) and charging electronics. When the UAV 40 is put back in its compartment and the lid 12 is closed, the charging electronics in the base unit 10 is connected to the UAV 40 through the dedicated charging pins in the stand-by connector 24,48. The charging electronics automatically analyses the UAV battery status and charges it according to pre-defined criteria (i.e. optimal, fast or maintenance). The excessive power means for recharging the UAV, is in this embodiment, a set of larger batteries 26 in the UAV kit—which in turn could be recharged from an external power supply.

In alternative embodiments, the charging electronics could be placed inside the UAV instead of in the base. In this case the base supplies power to the UAV trough the dedicated charging pins, and the UAV controls the charging voltage and current itself.

As previously indicated, the stand-by connector 24,48 is adapted to transfer electronic signals as well as the higher voltage and current used to charge the UAV batteries. It is then able to transfer all kinds of electronic data between the UAV 40 and the base unit 10. A UAV normally comprises a whole range of sensors, electronic circuits and software for providing different functions like navigation, automatic stabilization, radio communication, video processing. The software implementing these functions must in some way be uploaded to the UAV. This could with advantage be done through the stand-by connector, both the software as a whole or as update packets. For some applications, for example in intelligence services and covert operations, it is required that the UAV contains as little permanently stored information as possible, which also means as little software as possible. Since the connector 24,48 according to the embodiments herein could be active at any time when the UAV 40 is stored in its compartment, minimal software is required to be stored permanently in the UAV 40. The required software can simply be uploaded before each mission; making the UAV 40 appear as a "dead" device between the missions. This will prevent confidential information from being spread if the UAV accidently falls into wrong hands.

The stand-by connector 24,48 according to the embodiments herein can also be used in preparing secure communication between the base 10 and the UAV 40. In addition to control signals, the communication link between the UAV 40 and the base 10 may include information about the UAV's position, video pictures or sensitive sensor data. Since this information is transferred over a radio link, it could, if not properly protected, be intercepted by people with a compatible radio receiver. To prevent this, the data between the UAV and the base could be encrypted. To provide secure encryption, an exchange of encryption keys must have been carried out in advance of the encrypted communication session, for example in a separate link between the sender and the receiver. The stand-by connector 24,48 of the embodiments herein is perfectly adjusted to exchange such encryption keys, since it is a wired connection in a closed environment, and therefore almost impossible to monitor remotely. As the stand-by connection is active between each mission, the encryption keys can frequently be replaced with new keys for each mission, making the radio link between the base 10 and the UAV 40 even more secure.

Electronic keys may also be exchanged in order to synchronize the radio link frequencies between the UAV and the base.

The possibility of having a dedicated wired connection between the base and the UAV while in stand-by also makes it possible to reduce the load on the radio link during missions. For example, if the UAVs shall navigate according to a pre-defined route, the positions and flight data in the pre-defined route may be uploaded through the stand-by connector as part of the preparation before a flight. Other flight-specific data like configuration data for dedicated mission sensors or calibration data for the UAV's autopilot could be transferred as a part of the pre-flight preparation.

To enable autonomous navigation an UAV typically comprises a GPS for obtaining precise position data. The embodiments herein provide the possibility of a "hot start" of the GPS receiver (not shown) in the UAV 40. There is a general problem with GPS receivers that they need some time from they are switched on to they are able to locate the required number of GPS satellites and make a cross bearing to calculate a correct position. The UAV kit of the embodiments herein shall be available for immediate use; hence there might not be time to wait for the GPS to acquire a good position lock. The UAV 40 needs proper GPS positions within seconds after take-off. This is facilitated in one embodiment by an installation of a GPS receiver (with a better antenna than the GPS antenna in the UAV) in the control unit 30 and/or base part 10 of the UAV kit. Since the UAV 40 is placed inside the kit while being stored, it also shares the same position as the kit. The current position, time and satellite information at the time the UAV 40 is about to start a mission can then simply be transferred to the UAV. This eliminates the need for a "cold" initializing of the GPS receiver in the UAV.

In FIG. 3, details and features of the control unit 30 in the embodiments herein are shown. As earlier indicated, the control unit 30 typically has a shape where the control buttons 33,34,35 are placed on the control unit head 31, and the rest of the control unit constitutes the handle 32 which typically is thinner than the control unit head 31 to provide a natural handgrip around the unit. This design allows for one-hand operations of the control unit 30, in addition to a space-saving stacking between the UAVs 40 when not in use. The control unit 30 must, as a minimum, have buttons for traversing left or right and moving forward or back, either separately or in a first combined cross button 33 as illustrated in FIG. 3. Just as important is buttons for up and down control (not shown). It should also have extra buttons for functions like turn left or right, and sensor (video camera) tilt, again either separately or in a combined second cross button 34. Start, stop, OK and exit may be implemented on a separate function button 35. The buttons can have combined functions, i.e. for navigating in a graphical user interface appearing in the operator's display. The control unit 30 is connected to the rest of the base unit 10 with a cable 37.

In an alternative embodiment (not shown) the connection between the control unit and the base could be wireless. A short range transmitter/receiver in the control unit would automatically link up with a corresponding transmitter/receiver in the base. In such an embodiment the control unit comprises a rechargeable battery for powering the control unit's electronics. Trough a connector on the side of the unit this battery would automatically be charged every time the control unit is put back into the base.

The control unit 30 can be placed in the base 10 in two different ways; in a "stand-by" position or in a "ready" position. The stand-by position is the normal storage position where the control unit 30 is placed in its bay 14 with the forward side facing down (towards the bottom of the base). In this position the whole kit including the control unit 30 takes up a minimum of space and the control unit 30 is well protected. To hold the control unit 30 in this position, there is a grove 36 on each side of the handle 32 that corresponds to rails 28 on each side of the bay 14 in the base 10. The rails 28 each have a spring loaded knob (not shown) that loosely locks into a first hole in the groove (in the control unit) to hold it in place. In stand-by position, however, the control unit 30 is rotated around, with the forward side facing up (away from the bottom of the base). The grooves 36 still interfaces with the rails 28 in the bay 14, but in this position the control unit 30 is positioned higher up, ready to be immediately grabbed and lifted out of its bay 14 without having to shift or adjust the grip before it can be used to control the UAV 40. To maintain this higher "ready" position, the spring loaded knob loosely locks into a second hole in the groove.

Redundant space in the control unit 15 can be utilized for housing parts of the electronic components in the UAV kit, even if it is not directly connected to control unit functions. In an embodiment, all the RF devices (transmitter/receiver, antennas etc) for communicating with the UAV are located in the control unit. The remaining electronics, batteries 26 and connectors 27 for interfacing external equipment are mounted on a printed circuit board 25 in the base as indicated in the "exploded" view in FIG. 4.

In total, the electronic components should include at least one processor unit, a data memory unit, an RF transmitter/receiver unit (transceiver) and data buses to execute internal and external communication, controlling the different units and processing and storing data received from the UAVs. For example, live video streamed from the UAV during a mission will be received by the RF transceiver and if necessary decoded before being processed by the processor unit, and stored in the memory unit and/or transferred to the display for live playback. There should also be installed video playback software capable of replaying the stored video and a driver to drive the operators display properly. External communication may be accomplished through an integrated LAN interface. Alternative embodiments could instead, or in addition, utilize a Universal Serial Bus (USB) interface or a wireless connection, i.e. Wireless Local Area Network (WLAN).

In the following, a typical user scenario for the UAV kit is described. The UAVs 40 are stored in their respective UAV compartments, with the lids 12 locked. During storage, the UAV batteries have been charged by the excessive power means (extra battery, 26) in the base unit 10. Before one UAV 40 can be used, the operator must push an activation button on the base unit 10 to prepare the UAV 40 for mission. An indication lamp facing upwards towards the operator then turns from e.g. red to orange. During the activation period, all necessary software may be up-loaded from the base unit 10 to the UAV 40 through the stand-by connector 24, 48. Since the UAV 40 may contain no or minimal software when not in use, all general software should now be transferred. In addition, data specific for the upcoming mission (current position, positions in a predefined route or encryption and/or synchronization keys) could be transferred. When all software and data are loaded, the indication lamp will turn from e.g. orange to green, indicating that the UAV 40 is ready for a mission. The operator may then unlock the desired lid 12, swing it open and pick up the UAV 40 from inside the lid 12. The UAV 40 faces its bottom part 47 up and the nose towards the operator when the lid 12 is opened. In this position it is easy to grip the helicopter UAV 40, lift it loose from the lid 12 and swing it up and into position for take-off.

The helicopter takes off from the operator's hand after first having started the rotors. The start signal can come directly trough a button on the side of the UAV or indirectly trough the flight sensors (gyro, accelerometers) that may pick up a characteristic hand-movement indication "start".

If not already done while the UAV 40 was in its compartment, the start signal may also be used to establish the radio link between the UAV 40 and the control unit 30 using encryption keys exchanged during the activation period, and starting the camera to stream video images to the display. After an automatic take-off, the spinning rotors will keep the UAV 40 hanging in the air, allowing the operator to use the same hand to pick out the control unit 30 from the UAV kit. As earlier indicated, the control unit design allows for one-hand operation. The operator can start navigating the UAV 4) with the buttons 33,34 on the control unit head 31 or start the predefined route with his thumb whenever he is ready, while monitoring the mission on the display.

The mission itself may, as already indicated, have different purposes; like reconnoitering an area using the UAV camera as the operator's "eye", or collecting data for storage in the base and later preprocessing. Since both the UAV and the UAV kit may both be equipped with a GPS receiver, and since they constantly are in communication with each other, the UAV is at any time aware of both its own position and the UAV kit position, enabling it to navigate back to the UAV kit and the operator. Thus, there might be a button on the control unit activating a come back function, automatically bringing the UAV home.

When the UAV is back, the operator may stop the rotors with the control unit, causing the UAV to land softly on the ground. Finally, the UAV is safely put back in the UAV compartment for storage and recharging.

The invention claimed is:

1. An unmanned aerial vehicle kit, UAV-kit, for storage and control of at least one UAV, comprising
   at least one UAV with a UAV head and a UAV tail,
   a control unit with a control head and a handle for controlling the at least one UAV adjusted for one-hand operations, wherein the at least one UAV and the control unit when stored in the UAV-kit are stacked so that the UAV head is placed side-by-side with the handle,
   a base unit including one compartment for each of the at least one UAV and one bay for the control unit, the base unit being shaped to house the at least one UAV and the control unit,
   a stand-by connector inside each compartment housing the at least one UAV providing electric contact between the base unit and the respective UAV when the at least one UAV is stored in the UAV-kit wherein the respective stand-by connector when the associated UAV is placed in the UAV-kit is positioned in line with and in electrical contact with a corresponding second connector device mounted at the underside of the respective UAV,
   at least one fastening device for each of the at least one UAV inside the associated compartment being adjusted to keep the UAV firmly attached to the base unit, but still detachable from the base unit.

2. An UAV-kit according to claim 1, wherein the compartment for each UAV comprises a bay and a lid, hinged together, wherein each compartment is formed by a first cavity in the bay and a second cavity in the associated lid.

3. An UAV-kit according to claim 2, wherein the respective fastening device comprises two spring clips attached inside the second cavity positioned on each side of the UAV when the UAV is stored in the UAV-kit, the spring clips providing a spring force to both hold the respective UAV in the associated lid when the lid is opened and to allow removal of the UAV from the associated lid.

4. An UAV-kit according to claim 2, wherein the respective fastening device comprises two magnets attached inside the second cavity positioned on each side of the UAV when the UAV is stored in the UAV-kit, the magnets providing a magnetic force to both hold the respective UAV in the associated lid when the lid is opened and to allow removal of the UAV from the associated lie.

5. An UAV-kit according to claim 1, wherein the respective stand-by connector when the associated UAV is placed in the UAV-kit enables uploading of software to the associated UAV.

6. An UAV-kit according to claim 1, wherein the respective stand-by connector when the associated UAV is placed in the UAV-kit enables recharging of a battery installed in the associated UAV.

7. An UAV-kit according to claim 1, wherein the respective stand-by connector provides exchange of coding keys for provisioning a unique coded communication between the at least one and the base unit when on mission.

8. An UAV-kit according to claim 1, wherein the respective stand-by connector when the associated UAV is placed in the UAV-kit enables downloading of data from the associated UAV.

9. An UAV-kit according to claim 1, wherein the control unit contains at least one radio transmitter adjusted to transmit control signals to the at least one UAV.

10. An UAV-kit according to claim 1, wherein the control unit contains at least one radio receiver adjusted to receive data from the at least one.

11. An UAV-kit according to claim 1, wherein the base unit is provided with an activation button for starting an initializing process preparing the at least one UAV for a mission.

12. An UAV-kit according to claim 1, wherein the at least one UAV comprises a GPS receiver and the control unit is adjusted to provide the at least one UAV with initial GPS data during an initializing process.

13. An UAV-kit according to claim 1, wherein the at least one UAV comprises sensors adjusted to pick up a characteristic hand-movement indicating that the UAV should start a mission.

14. An UAV-kit according to claim 1, wherein the base unit is provided with a video output device for connection of a video display to the base unit for streaming and playing back video recorded by the at least one UAV and transmitted on a radio link between the at least one UAV and the base unit.

15. An UAV-kit according to claim 1, wherein the base unit includes at least one base battery and a charger, the charger is adjusted to charge UAV batteries in the at least one UAV in stand-by mode, and the base battery is adjusted to supply power to the charger and the electronics in the base unit.

16. An UAV-kit according to claim 1, comprising a poach containing the base unit provided with suspension means adjusted to make the UAV kit attachable to an operator's clothing.

17. An UAV-kit according to claim 4, wherein the lid of the compartment for each UAV is hinged so that the UAV is facing towards an operator when the lid is in the open position.

* * * * *